United States Patent
Deepak et al.

(10) Patent No.: US 10,819,682 B1
(45) Date of Patent: Oct. 27, 2020

(54) SYSTEMS AND METHODS FOR HIGH-EFFICIENCY NETWORK-PACKET FILTERING

(71) Applicant: Facebook, Inc., Menlo Park, CA (US)

(72) Inventors: Anant Deepak, San Jose, CA (US); Puneet Mehra, Alameda, CA (US); Zequn Huang, Sunnyvale, CA (US); Huapeng Zhou, Menlo Park, CA (US); Nikita Shirokov, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 215 days.

(21) Appl. No.: 15/996,552

(22) Filed: Jun. 4, 2018

(51) Int. Cl.
*H04L 29/06* (2006.01)

(52) U.S. Cl.
CPC ...... *H04L 63/0236* (2013.01); *H04L 63/0263* (2013.01)

(58) Field of Classification Search
CPC ....... G06F 16/285–287; H04L 41/0889; H04L 41/0893; H04L 41/12; H04L 41/28; H04L 63/0227–0236; H04L 63/0263; H04L 63/20–205
See application file for complete search history.

(56) References Cited

U.S. PATENT DOCUMENTS

| | | | | |
|---|---|---|---|---|
| 7,043,659 B1 * | 5/2006 | Klein | .................. | H04L 41/0631 714/26 |
| 2004/0249812 A1 * | 12/2004 | Scoredos | ............ | G06F 16/2343 |
| 2018/0124118 A1 * | 5/2018 | Wu | ........................ | H04L 43/026 |
| 2018/0176183 A1 * | 6/2018 | Shah | .................... | H04L 63/0263 |
| 2019/0166057 A1 * | 5/2019 | Gilson | .................... | H04L 65/80 |

* cited by examiner

*Primary Examiner* — Kevin Bechtel
(74) *Attorney, Agent, or Firm* — FisherBroyles, LLP

(57) ABSTRACT

The disclosed computer-implemented method may include (i) configuring a packet filtering policy at least in part by defining an attribute map and a set of network-packet filtering rules that use logical groupings of distinguishing attributes as input parameters, (ii) after configuring the packet filtering policy, receiving an incoming network packet, (iii) extracting distinguishing attributes from the incoming network packet, (iv) translating, based on the attribute map, the distinguishing features extracted from the incoming network packet into logical groupings associated with the network packet, and (v) applying the packet filtering policy to the incoming network packet by using the logical groupings associated with the network packet as input parameters to the filtering rules. Various other methods, systems, and computer-readable media are also disclosed.

18 Claims, 10 Drawing Sheets

SYSTEMS AND METHODS FOR HIGH-EFFICIENCY NETWORK-PACKET FILTERING

BACKGROUND

Individuals and organizations may employ a variety of methods to secure their computing systems and/or networks against unwanted network traffic. For example, a business office may use a variety of systems and/or devices to prevent unauthorized users from accessing the office network, to prevent employees from accessing prohibited content, and/or to protect sensitive material from being inappropriately distributed. Some systems for securing a network may include filtering network packets based on a set of filtering rules. Network security systems may handle the network packet based on these filtering rules.

Unfortunately, traditional network packet filtering systems suffer from a variety of drawbacks. For example, a traditional network packet filtering system may employ an ordered list of matching criteria and dispositions. In order for such a traditional network packet filtering system to successfully process a single network packet, the system may be required to match features of the network packet against each filtering rule in succession until a match is found. Moreover, such ordered-list filtering rulesets may be difficult for administrators to maintain. For example, an administrator may need to know exactly where in the ordered list a new rule should be inserted, as the first-matched rule will determine how a given network packet is handled. In view of the deficiencies in these traditional systems, the instant disclosure identifies and addresses a need for high-efficiency network-packet filtering.

SUMMARY

As will be described in greater detail below, the instant disclosure describes systems and methods for filtering network packets based on logical associations and/or categories of network packets. In one example, a computer-implemented method for high-efficiency network-packet filtering may include (i) configuring a packet filtering policy at least in part by (A) defining an attribute map that associates distinguishing attributes of network packets with logical groupings of distinguishing attributes, and (B) defining one or more filtering rules using logical groupings as input parameters for the filtering rules, (ii) receiving, after configuring the packet filtering policy, an incoming network packet as part of examining a network connection that is subject to the packet filtering policy, (iii) extracting one or more distinguishing attributes of the network connection from the incoming network packet, (iv) translating, based on the attribute map, the one or more distinguishing attributes extracted from the incoming network packet into one or more logical groupings of the incoming network packet, and (v) applying the packet filtering policy to the incoming network packet by using the one or more logical groupings of the incoming network packet as input parameters to the one or more filtering rules.

The filtering rules may behave in a variety of ways. In some embodiments, at least one of the filtering rules may filter, with the same filtering result, differing incoming network packets that include different distinguishing attributes based on the distinguishing attributes of the network packets each being associated with the same logical grouping in the attribute map. Furthermore, two or more filtering rules may use the same logical grouping as an input parameter. Additionally or alternatively, the method may include incrementing, for each filtering rule in the set of filtering rules a trigger counter associated with the filtering rule each time the filtering rule matches a network packet.

The attribute map may be implemented in a variety of ways. In some examples, the attribute map may incorporate a hash map that uses distinguishing attributes of network packets as keys of the hash map and uses logical groupings as values of the hash map. In further examples, the method may include defining multiple attribute-specific attribute maps at least in part by assigning, to each attribute-specific attribute map, a corresponding category of distinguishing attributes for use as input parameters. Moreover, the method may include updating the filtering policy for network packets that include a particular distinguishing attribute by modifying, within the attribute map, the logical groupings that are associated with the particular distinguishing attribute.

The distinguishing attributes may include a variety of attribute types. For example, the distinguishing attributes may include at least one of a host Internet Protocol (IP) address, a destination IP address, a host port, a destination port, a subnet address, a source Media Access Control (MAC) address, a destination MAC address, a protocol and/or traffic type (e.g., an Ethertype), and/or an IP address prefix.

In some embodiments, the method may further include updating and/or consolidating obsolete filtering rules. For example, the method may include (i) determining that each input parameter of each obsolete filtering rule in a set of obsolete filtering rules is associated, by the attribute map, with a particular logical grouping, (ii) determining that each obsolete filtering rule in the set of obsolete filtering rules applies the same filtering result to each network packet that matches the obsolete filtering rule, and (iii) generating a unified filtering rule that uses the particular logical grouping as an input parameter and applies the same filtering result to incoming network packets with distinguishing attributes that match the particular logical grouping. Additionally or alternatively, the method may include converting an obsolete filtering rule that uses a specific distinguishing attribute as an input parameter into an updated filtering rule that uses, as defined in the attribute map, at least one logical grouping of the specific distinguishing attribute as an input parameter.

In addition, a corresponding system for high-efficiency network-packet filtering may include several modules stored in a memory and executed by at least one physical computer processor. Such a system may include (i) a configuration module, stored in the memory, that configures a packet filtering policy at least in part by (A) defining an attribute map that associates each of a set of distinguishing attributes of network packets with one or more logical groupings of distinguishing attributes, and (B) defining one or more filtering rules for filtering network packets subject to the packet filtering policy, using the one or more logical groupings of distinguishing attributes as input parameters for the one or more filtering rules, (ii) a reception module, stored in the memory, that receives, after the configuration module configures the packet filtering policy, an incoming network packet as part of examining a network connection that is subject to the packet filtering policy, (iii) an extraction module, stored in the memory, that extracts one or more distinguishing attributes of the network connection from the incoming network packet, (iv) a translation module, stored in the memory of the system, that translates, based on the attribute map, the one or more distinguishing attributes extracted from the incoming network packet into one or more logical groupings of the incoming network packet, (v) an enforcement module, stored in the memory, that applies the packet filtering policy to the incoming network packet by using the one or more logical groupings of the incoming network packet as input parameters to the one or more filtering rules, and (vi) at least one physical computer processor that is configured to execute the configuration module, the reception module, the extraction module, the translation module, and the enforcement module.

In some examples, the above-described method may be encoded as computer-readable instructions on a computer-readable medium. For example, a computer-readable medium may include one or more computer-executable instructions that, when executed by at least one processor of a computing device, may cause the computing device to (i) configure a packet filtering policy at least in part by (A) defining an attribute map that associates each of a plurality of distinguishing attributes of network packets with one or more logical groupings of distinguishing attributes, and (B) defining one or more filtering rules for filtering network packets subject to the packet filtering policy, using the one or more logical groupings of distinguishing attributes as input parameters for the one or more filtering rules, (ii) receive, after configuring the packet filtering policy, an incoming network packet as part of examining a network connection that is subject to the packet filtering policy, (iii) extract one or more distinguishing attributes of the network connection from the incoming network packet, (iv) translate, based on the attribute map, the one or more distinguishing attributes extracted from the incoming network packet into one or more logical groupings of the incoming network packet, and (v) apply the packet filtering policy to the incoming network packet by using the one or more logical groupings of the incoming network packet as input parameters to the one or more filtering rules.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
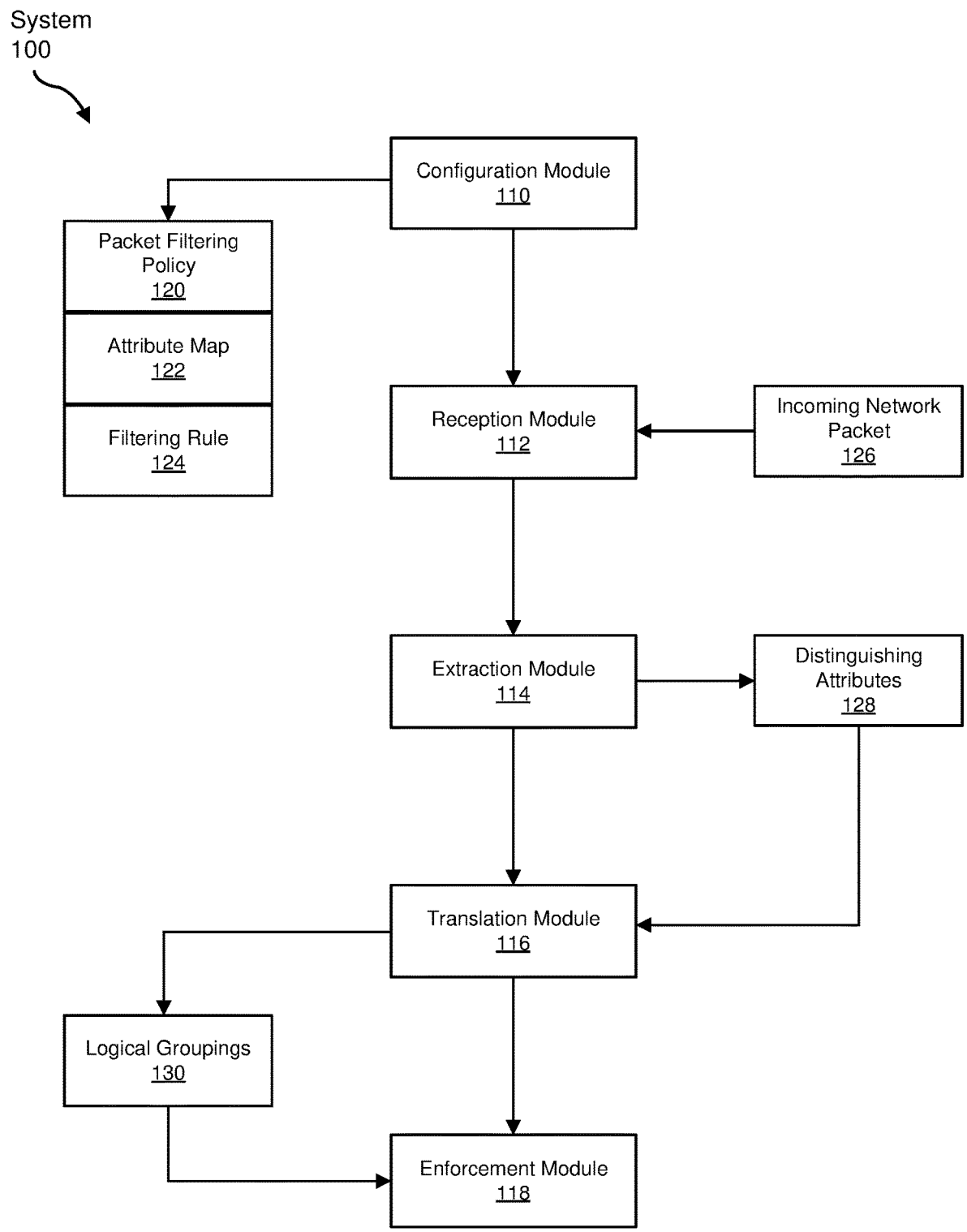
FIG. 1 is a block diagram of an example system for high-efficiency network-packet filtering.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed towards systems and methods for high-efficiency network-packet filtering. As will be explained in greater detail below, embodiments of the instant disclosure may enable network packet filtering policies to use rules that filter network packets based on logical groupings. The instant disclosure provides for attribute maps that may be used to translate various distinguishing attributes of incoming network packets into logical groupings. By configuring filtering rules based on logical groupings in this way, the systems and methods described herein may enable filtering policies to be configured with fewer filtering rules than traditional filtering systems while still filtering network packets as directed by a system administrator. A filtering policy that uses fewer filtering rules may improve the functioning of a network security system by reducing the number of comparisons between aspects of a network packet and filtering rules to arrive at a final filtering disposition. Moreover, filtering rules written based on logical groupings may be easier for administrators and/or users to quickly interpret and/or modify while minimizing the potential for human error.

The following will provide, with reference to FIG. 1, detailed descriptions of systems for high-efficiency network-packet filtering. Detailed descriptions of an example method for high-efficiency network-packet filtering will be provided in connection with FIG. 2. Descriptions of various components of systems for high-efficiency network-packet filtering will be described in connection with FIGS. 3-6. Detailed descriptions of additional systems for high-efficiency network-packet filtering will be provided in connection with FIGS. 7-9.

FIG. 1 is a block diagram of an example system 100 for high-efficiency network-packet filtering. The modules illustrated in FIG. 1 may be implemented on any suitable computing device and/or network device. For example, and as will be described in greater detail below, all or a portion of system 100 may be implemented on a network gateway device, a router, or other computing device that manages network traffic between computing devices. Additionally or alternatively, all or a portion of system 100 may be implemented on a user's endpoint device, such as a personal computer and/or workstation. The modules of system 100 may be implemented in a variety of ways. For example, the software modules of system 100 may be implemented as part of network security software that secures computing devices against unwanted and/or unpermitted network communications.

As will be explained in greater detail below, the modules illustrated in FIG. 1 may perform a variety of tasks when performing high-efficiency network-packet filtering. For example, configuration module 110 may configure a packet filtering policy 120 at least in part by defining an attribute map 122. Attribute map 122 may associate various distinguishing attributes of network packets with logical groupings of distinguishing attributes. Configuration module 110 may also configure packet filtering policy 120 at least in part by defining one or more filtering rules, such as filtering rule 124, that use logical groupings of distinguishing attributes as input parameters. After configuration module 110 has configured packet filtering policy 120, reception module 112 may receive an incoming network packet 126 as part of examining a network connection that is subject to packet filtering policy 120. Extraction module 114 may extract distinguishing attributes 128 from incoming network packet 126. Translation module 116 may translate distinguishing attributes 128 into logical groupings 130 using the associations defined in attribute map 122. Finally, enforcement module 118 may apply packet filtering policy 120 to incoming network packet 126 by using logical groupings 130 as input parameters to filtering rule 124 and/or any other applicable filtering rules defined as part of packet filtering policy 120. Enforcement module 118 may then handle incoming network packet 126 according to any appropriate filtering actions triggered by filtering rules that match any or all of logical groupings 130.

Figure 2:
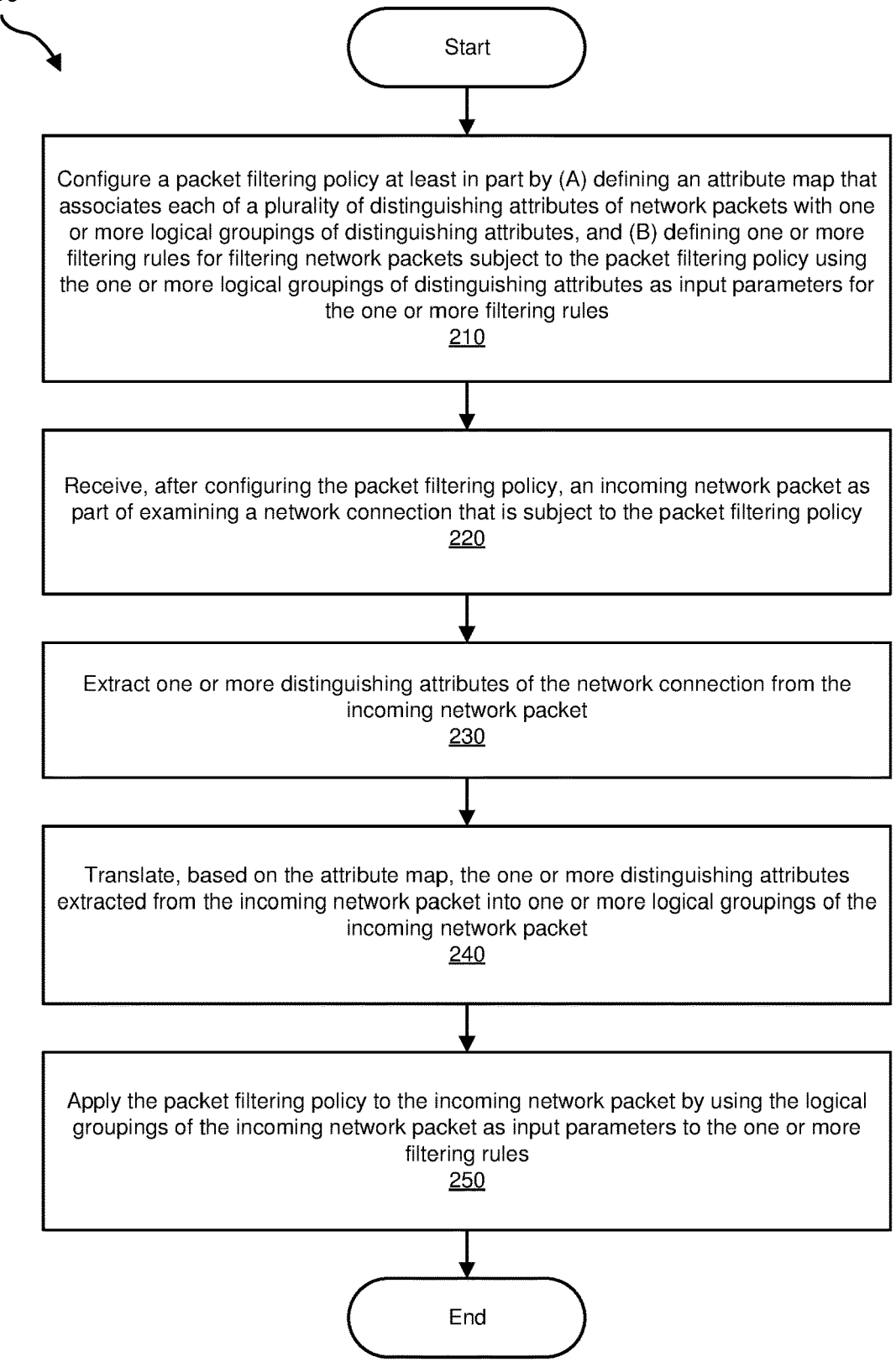
FIG. 2 is a flow diagram of an example method for high-efficiency network-packet filtering.

FIG. 2 is a flow diagram of an exemplary computer-implemented method 200 for performing high-efficiency network-packet filtering. The steps shown in FIG. 2 may be performed by any suitable computer-executable code and/or computing system, including the system(s) illustrated in FIG. 1. In one example, each of the steps shown in FIG. 2 may represent an algorithm whose structure includes and/or is represented by multiple sub-steps, examples of which will be provided in greater detail below.

As illustrated in FIG. 2 at step 210, one or more of the systems described herein may configure a packet filtering policy at least in part by (A) defining an attribute map that associates distinguishing attributes of network packets with logical groupings of distinguishing attributes, and (B) defining one or more filtering rules using logical groupings as input parameters for the filtering rules. For example, configuration module 110 may configure packet filtering policy 120 at least in part by defining attribute map 122 and filtering rule 124.

Configuration module 110 may configure packet filtering policy 120 in a variety of contexts. In some embodiments, configuration module 110 may execute as part of a network device that monitors and manages network traffic. For example, configuration module 110 may execute as part of a network gateway. In this example, an administrator may cause configuration module 110 to configure, at the network device, packet filtering policy 120 by manually assigning relationships between distinguishing attributes and logical groupings in attribute map 122 as well as by manually defining filtering rule 124. Additionally or alternatively, configuration module 110 may execute as part of a network security backend that pushes configuration files to network devices. In these embodiments, an administrator may configure packet filtering policy 120 as described above, and the network security backend may then push the configured packet filtering policy 120 to any applicable network devices and/or security systems. Such a network security backend may operate as part of the same network as the network device, such as on a Local Area Network (LAN) that serves a particular building or portion of a building. Additionally or alternatively, a network security backend may operate as part of a service provided by a security vendor and push packet filtering policies to client devices that subscribe to the service.

In some embodiments, the term "packet filtering policy" may refer to any type or form of determining how to treat a network packet that is being passed through a network node such as an endpoint device, router, switch, and the like. A packet filtering policy may be configured in a variety of ways. In some embodiments, a packet filtering policy may be configured by defining filtering rules and/or by defining an attribute map, as will be described in greater detail below. Moreover, a packet filtering policy may be configured, enforced and/or implemented in a variety of contexts. For example, a packet filtering policy may be enforced by software such as firewalls, network security suites, intrusion detection/prevention systems, data-loss prevention systems, and/or any other suitable software system that monitors and/or manages network traffic. In some embodiments, a packet filtering policy may be implemented at a variety of points throughout a network. For example, the software and/or other systems that enforce and/or configure a filtering policy may execute on an endpoint device, a network router, a network switch, a network gateway, and/or any other suitable point within a network.

Figure 3:
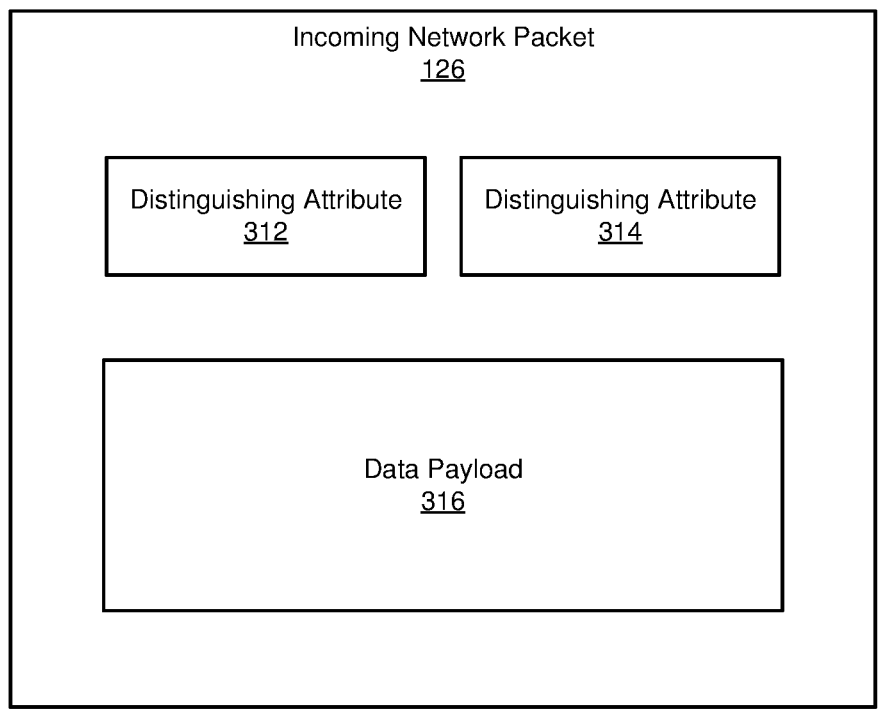
FIG. 3 is a block diagram of an example attribute map.

FIG. 3 is a block diagram of an example network packet that may be subject to a packet filtering policy. In the example of FIG. 3, incoming network packet 126 includes distinguishing attributes 312 and 314. In this simplified example, distinguishing attributes 312 and 314 may correspond to a source IP address and a destination IP address, although other examples of network packets may include any suitable variety or combination of distinguishing attributes, as will be described further below. Incoming network packet 126 also includes a data payload 316 that represents information being transferred between computing devices.

In some examples, the term "filtering rule" may refer to a process, an algorithm, and/or a component of an algorithm for determining how to handle incoming network packets. Filtering rules may use a variety of parameters as inputs. For example, filtering rules as described herein may use logical groupings of distinguishing attributes as input parameters. A filtering rule may then associate these input parameters with a filtering action that will be applied to any network packets that match the filtering rule. Examples of input parameters include, without limitation, logical groupings, host IP addresses, destination IP addresses, host ports, destination ports, subnet addresses, subnet masks, MAC addresses, IP address prefixes, Transmission Control Protocol (TCP) flags, IPv6 flow labels, combinations of one or more of the same, and/or any other distinguishing feature of a network packet that may be used to evaluate how the network should handle the network packet. Examples of filtering actions include, without limitation, forwarding the network packet to its destination, dropping the network packet (thereby preventing it from reaching its destination), redirecting the network packet to a specified destination, creating a log entry that describes the network packet and/or any filtering actions taken against the network packet, incrementing an action counter associated with the triggered filtering rule, reply to an upstream source of the network packet, combinations of one or more of the same, and/or any other suitable method of handling a network packet.

In some embodiments, two or more filtering rules use the same logical grouping as an input parameter. Additionally, some filtering rules may use more than one logical grouping as an input parameter. For example, a filtering policy may include a filtering rule for network packets that are associated with the logical groupings "development workstation" and "research department," and another filtering rule for network packets that are associated with the logical groupings "build servers" and "research department." In these examples, the filtering rule may require that the incoming network packet be associated with all applicable logical groupings in order to trigger the filtering rule. In some embodiments, filtering rules may include Boolean logic operators in combination with logical groupings to define the triggering conditions. For example, a filtering rule may use the trigger condition, "development workstation, NOT research department." In this example, the filtering rule may trigger off of network packets associated with the "development workstation" logical grouping that are also not associated with the "research department" logical grouping. By allowing filtering rules to trigger based on any suitable combination and/or exclusion of logical groupings in this way, the systems and methods described herein may streamline filtering policy setup, reduce administrative burdens for maintaining filtering policies, and improve clarity of filtering systems by enhancing the readability of filtering rules.

Figure 4:
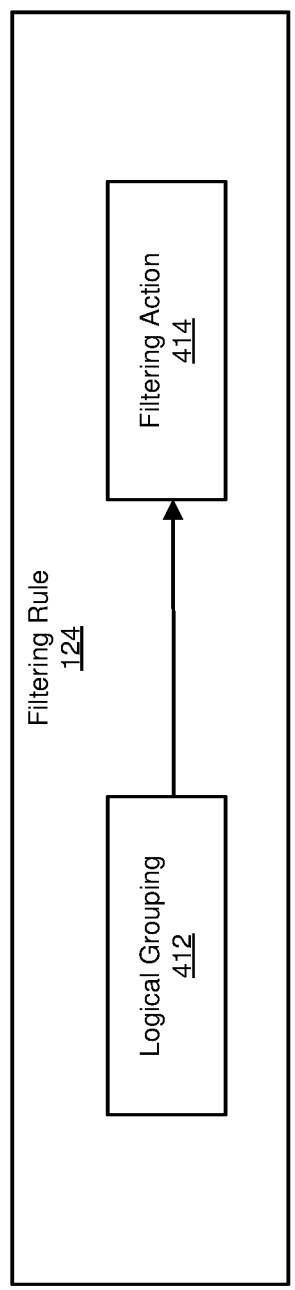
FIG. 4 is a block diagram of an example logical grouping.

FIG. 4 is a block diagram of an example filtering rule. In the example of FIG. 4, filtering rule 124 from FIG. 1 maps logical grouping 412 to filtering action 414. When a network packet that is associated with logical grouping 412 is tested against filtering rule 124, packet filtering policy 120 may treat the network packet in accordance with the actions prescribed by filtering action 414. Filtering policy 120 may include any suitable number of filtering rules, arranged in any suitable order. In some embodiments, filtering policy 120 may include an ordered list of filtering rules.

In some embodiments, the term "attribute map" may refer to any type or form of data structure that associates distinguishing attributes of network packets with logical groupings. As described in greater detail above, these distinguishing attributes may include a range of information about the network packet. However, these distinguishing attributes may only narrowly describe a data source, destination, etc. For example, an IP address may only identify a single computing device. An attribute map may correlate each distinguishing attribute (e.g., a particular IP address) with one or more logical groupings. For example, an attribute map may associate a source IP address with the logical groupings "engineer workstation" and "research department," thereby indicating that network packets originating from that IP address should be managed by filtering rules directed towards managing "engineer workstations" and computing devices from the "research department" of an organization. Writing filtering rules according to logical groupings may streamline administrative upkeep of filtering policies and also improving the efficiency of the network packet filtering system by reducing the number of rules that need to be tested before reaching a disposition on how to handle a network packet. Attribute maps may be implemented in a variety of ways. For example, an attribute map may be implemented as a hash map that uses distinguishing attributes as keys and logical groupings (or codes to indicate one or more logical groupings) as values of the hash map. Additionally or alternatively, an attribute map may be implemented as a table, an array-based direct-indexing map, a tree-based map, and/or any other suitable data structure for correlating distinguishing attributes of network packets with logical groupings in an efficient manner. These data structures may allow for faster lookups of specific keys (in these embodiments, the distinguishing attributes of network packets) over ordered comparisons for each possible key stored in the attribute map.

In some embodiments, configuration module 110 may use or modify different data structures for a particular attribute map depending on the nature of the data being stored in that particular attribute map. For example, port numbers for a network device may always be within the range of 0 to 65535. In this example, a table or array that represents an attribute map of port numbers may be bounded to this range. As an additional example, an attribute map for IP prefix matching may best be implemented as a tree-traversal data structure. By selecting differing data structures for differing attribute maps in this way, the systems and methods described herein may ensure that distinguishing attributes may be rapidly and/or efficiently translated into logical groupings, as will be described in greater detail below.

Figure 5:
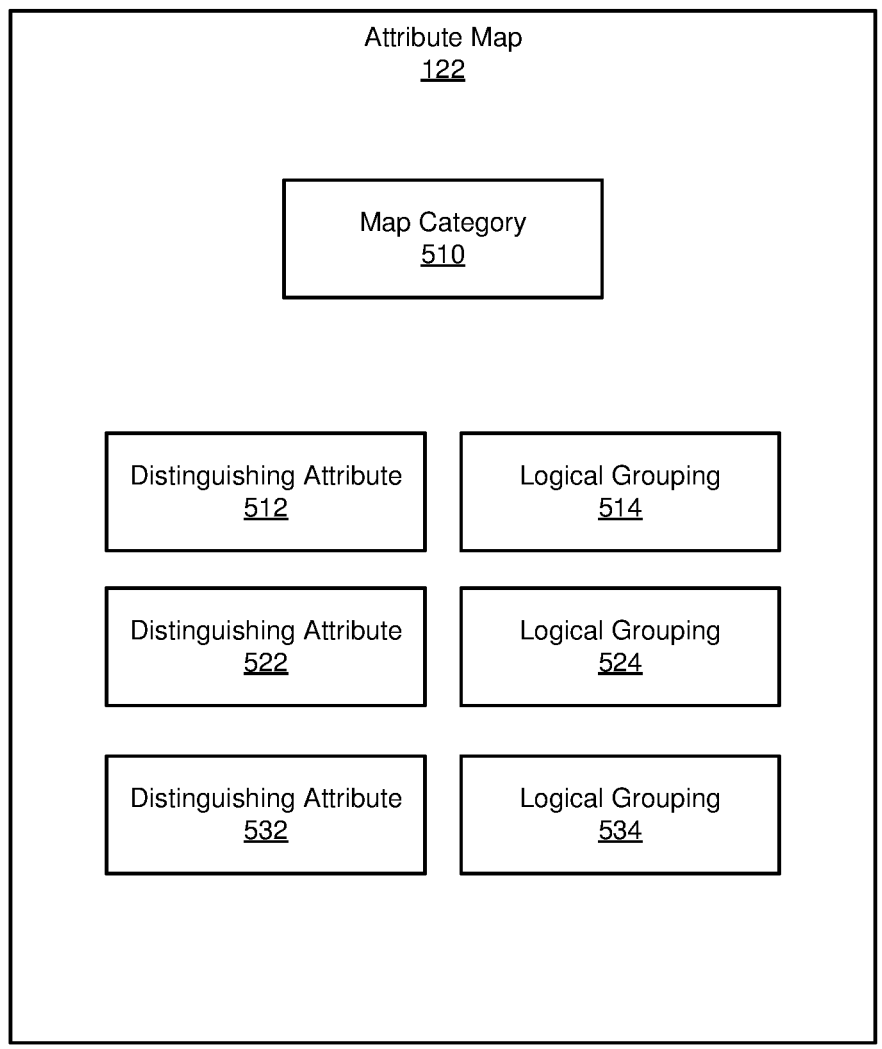
FIG. 5 is a block diagram of an example network packet.

FIG. 5 is a block diagram of an example attribute map. As shown in FIG. 5, attribute map 122 may map a variety of distinguishing attributes to logical groupings. In the example of FIG. 5, attribute map 122 maps distinguishing attribute 512 to logical grouping 514, distinguishing attribute 522 to logical grouping 524, and distinguishing attribute 532 to logical grouping 534. As will be described in greater detail below, other elements of the systems described herein may use these associations to translate distinguishing attributes into logical groupings. Additionally, attribute map 122 may include information specifying a map category for attribute map 122. Map category 510 may specify a general type of distinguishing attribute mapped by attribute map 122. For example, map category 510 may indicate that attribute map 122 maps IP addresses to logical groupings.

In some embodiments, configuration module 110 may define a collection of attribute-specific attribute maps. Configuration module 110 may define these attribute-specific maps at least in part by assigning, to each attribute-specific attribute map, a corresponding category of distinguishing attributes for use as input parameters (i.e., by assigning map category 510 for each attribute map). In embodiments where the systems and methods described herein define and use multiple attribute maps, the information indicated by map category 510 may aid the systems and methods described herein may search the attribute map that matches the type of distinguishing attribute under evaluation to avoid searching irrelevant attribute maps. Additionally, using attribute-specific maps may enhance the ability of system administrators and/or automated systems to modify packet filtering policy 120 by enabling quick and/or simplified location of necessary mappings between distinguishing attributes and logical groupings.

In some examples, the term "logical grouping" may refer to any word, phrase, or other suitable indicator used to designate a collection of distinguishing attributes as being associated with each other in some way. For example, IP addresses that correspond to a research department of an organization may be included within the "research department" logical grouping. As an additional example, destination ports on a computing system that are closed to avoid unwanted network traffic may be included within the logical grouping "closed ports." As described elsewhere, the various systems and methods described herein may evaluate the logical groupings associated with a network packet when determining how to handle that network packet.

Figure 6:
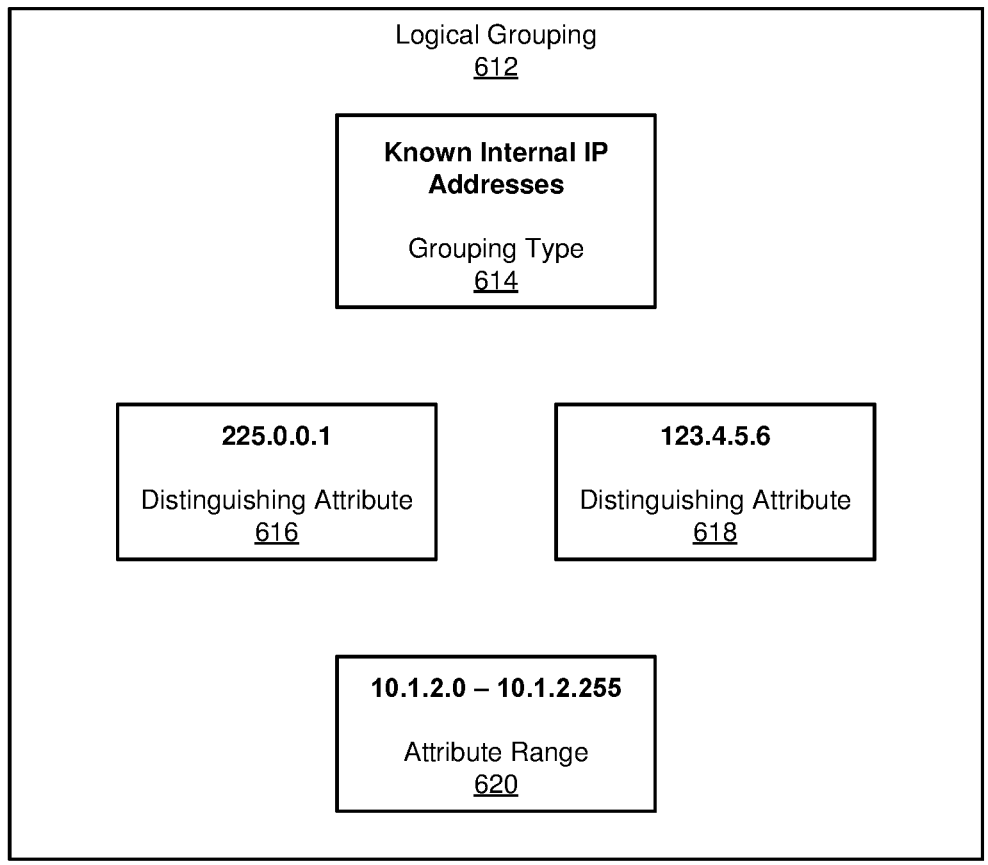
FIG. 6 is a block diagram of an example filtering rule.

FIG. 6 is an illustrated example of a logical grouping 612 that represents a logical association between distinguishing attributes 616 and 618 as well as an attribute range 620. In the example of FIG. 6, these distinguishing attributes all represent "known internal IP addresses," as indicated by grouping type 614. Although illustrated as a standalone element, logical grouping 612 may not be explicitly defined as a unique element. Rather, an attribute map may include entries mapping distinguishing attributes 616 and 618 as well as attribute range 620 to logical grouping 612 and/or grouping type 614. Moreover, a single distinguishing attribute may be associated with more than one logical grouping, as will be described in greater detail below.

Although the above examples of logical groupings describe the logical groupings in terms of natural language, logical groupings and/or combinations of logical groupings may be described in any suitable manner. For example, a particular combination of logical groupings may be described by a hash that represents one or more logical groupings, secondary grouping identifier, or other label that represents the combination of logical groupings, and this hash or secondary identifier may be treated as its own unique logical grouping. As a specific example, a combination of the plain English logical groupings "known internal IP addresses" and "workstations" may be represented by the grouping "int/workstation" or any other suitable identifier. Similarly, the plain English logical groupings may be processed by a hashing algorithm to yield the grouping label "kipaws," which the systems and methods described herein may treat as a unique logical grouping. By combining logical groupings in this way, the systems and methods described herein may allow filtering rules to match on simplified inputs, thereby reducing match-processing overhead and improving end-user comprehension of how a filtering rule is expected to behave.

In some examples, configuration module 110 may convert and/or update obsolete filtering rules that were created by other systems. For example, configuration module 110 may convert an obsolete filtering rule that uses a specific distinguishing attribute as an input parameter into an updated filtering rule that uses, as defined in attribute map 122, at least one logical grouping of the specific distinguishing attribute as an input parameter. In this example, configuration module 110 may translate, using attribute map 122, the input parameter for the obsolete filtering rule into a logical grouping, then generate a new filtering rule that uses the logical grouping as an input parameter and the filtering disposition of the obsolete filtering rule as an output. In some embodiments, configuration module 110 may merge the obsolete filtering rule with an existing, updated filtering rule such as filtering rule 124. For example, configuration module 110 may determine that a filtering rule identical to the new filtering rule described above is already defined by packet filtering policy 120. In this example, configuration module 110 may simply the obsolete filtering rule and process further packets that include the specific distinguishing attribute according to the logical groupings defined in attribute map 122.

In further embodiments, configuration module 110 may convert a group of obsolete filtering rules into a single unified filtering rule. For example, configuration module 110 may determine that each input parameter of each obsolete filtering rule in the group is associated, within attribute map 122, with a particular logical grouping. Configuration module 110 may also determine that each obsolete filtering rule in the group applies the same filtering result to each network packet that triggers the obsolete filtering rule. Based on these determinations, configuration module 110 may then generate a unified filtering rule that uses the particular logical grouping as an input parameter and applies the filtering result to incoming network packets that are associated with logical groupings that match the input logical grouping. As a specific example, configuration module 110 may identify several obsolete filtering rules that trigger off of network packets that include IP addresses associated with the logical grouping, "known malicious IP address." Configuration module 110 may also determine that each of these obsolete filtering rules indicates that matching packets should be blocked. Based on this information, configuration module 110 may generate a unified filtering rule that uses "known malicious IP address" as an input parameter and "block network packet" as an output filtering action. Other elements of system 100 may then use this unified filtering rule instead of the obsolete filtering rules. By reducing the number of filtering rules that must be examined in this way, configuration module 110 may reduce the number of comparisons that must be made between filtering rules and incoming network packets, thereby reducing the resource costs (e.g., processor cycles, electrical power, time, etc.) associated with filtering network packets.

Figure 7:
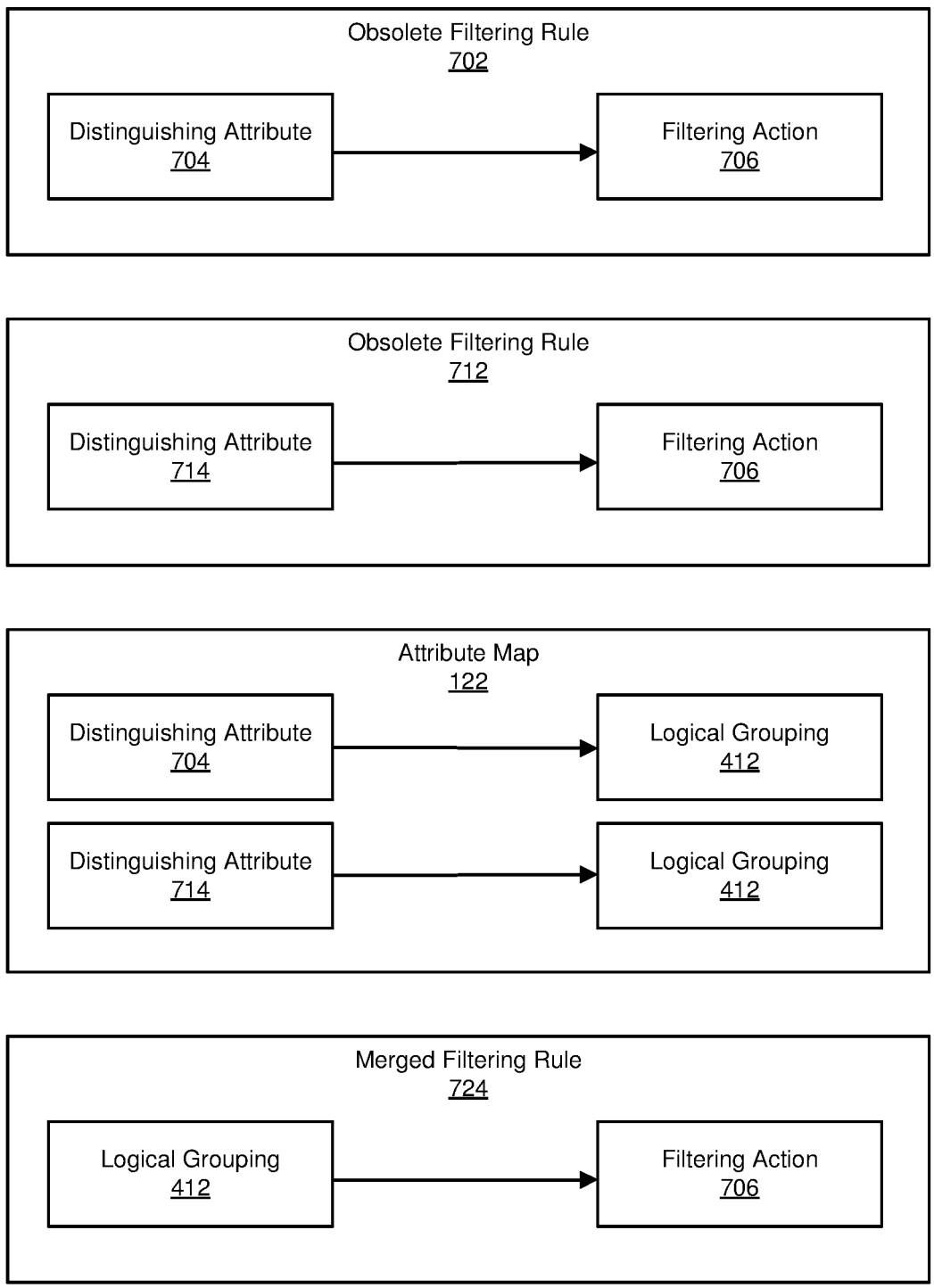
FIG. 7 is a block diagram of an example process for updating obsolete filtering rules into filtering rules that use logical groupings as inputs

FIG. 7 is an illustrated example process for updating obsolete filtering rules. As shown in FIG. 7, an obsolete filtering rule 702 may indicate that network packets that include distinguishing attribute 704 should be treated according to filtering action 706. Similarly, a different obsolete filtering rule, illustrated as obsolete filtering rule 712, may indicate that network packets including distinguishing attribute 714 should be treated according to filtering action 706. Configuration module 110 may use attribute map 122 to determine that distinguishing attribute 704 and distinguishing attribute 714 are both mapped to logical grouping 412. Configuration module 110 may accordingly merge obsolete filtering rules 702 and 712 into merged filtering rule 724, which indicates that network packets associated with logical grouping 412 should be treated in accordance with filtering action 706. As may be appreciated from the preceding description, configuration module 110 may in this way reduce the total number of filtering rules maintained in a filtering policy, thereby improving both the ability of human users to manage the filtering policy as well as the efficiency of network security systems that implement the filtering policy.

Returning to FIG. 2 at step 220, one or more of the systems described herein may receive, after the packet filtering policy has been configured, an incoming network packet as part of examining a network connection that is subject to the packet filtering policy. For example, reception module 112 may receive incoming network packet 126 as part of examining a network connection that is subject to packet filtering policy 120.

Reception module 112 may receive incoming network packet 126 in a variety of contexts. In some embodiments, all or a portion of reception module 112 may execute as part of network hardware that directly handles network traffic. For example, reception module 112 may execute on a gateway device that acts as an interface between networks. As an additional example, reception module 112 may execute as part of an endpoint security system, such as a firewall, that monitors and manages network connections for a single computing device. In these examples, reception module 112 may receive incoming network packet 126 directly at the gateway, router, and/or endpoint computing device. In some examples, reception module 112 may forward incoming network packet 126 to other elements of system 100 executing on local hardware, e.g., a context in which reception module 112 and other elements of system 100 execute on the same computing device. In further examples, reception module 112 may forward incoming network packet 126 to a remote system, such as a network-packet processing backend, described in greater detail below.

In further embodiments, all or a portion of reception module 112 may execute as part of a dedicated network-analysis system, such as a network-packet processing backend system that analyzes network packets for multiple gateway devices. As a specific example of such a network-packet processing backend system, an organization with a building-wide network may use a central network-packet inspection system to provide packet analysis for gateway devices that facilitate network activity between the building's internal network and external networks such as the Internet.

At step 230 in FIG. 2, one or more of the systems described herein may extract one or more distinguishing attributes of the network connection from the incoming network packet. For example, extraction module 114 may extract distinguishing attributes 128 from incoming network packet 126.

Extraction module 114 may extract distinguishing attributes 128 from incoming network packet 126 in a variety of ways. In some embodiments, extraction module 114 may extract distinguishing attributes 128 from header fields and/or other metadata about incoming network packet 126. Extraction module 114 may determine the type of each extracted distinguishing attribute based on the field in which the distinguishing attribute data was stored. For example, extraction module 114 may extract data from the "source IP address" header field of incoming network packet 126 and accordingly treat that data as the "source IP address" distinguishing attribute of incoming network packet 126.

Extraction module 114 may operate in a variety of contexts. For example, extraction module 114 may execute on the same computing system as other elements of system 100. As a specific example, some or all of system 100, including extraction module 114, may execute on a network gateway device. Additionally or alternatively, extraction module 114 may execute on a different computing system from other elements of system 100. For example, extraction module 114 may execute as part of a network-packet processing backend that analyzes network packets for multiple gateway devices, as described above in connection with reception module 112.

At step 240 in FIG. 2, one or more of the systems described herein may translate, based on the attribute map, the one or more distinguishing attributes extracted from the incoming network packet into one or more logical groupings of the incoming network packet. For example, translation module 116 may translate distinguishing attributes 128 into logical groupings 130 based on associations between distinguishing attributes 128 and logical groupings 130 within attribute map 122.

Translation module 116 may use attribute map 122 to translate distinguishing attributes 128 into logical groupings 130. For example, translation module 116 may, for each distinguishing attribute extracted from incoming network packet 126, search attribute map 122 for a corresponding entry. In this example, translation module 116 may search attribute map 122 for an entry corresponding to a specific source IP address and retrieve any logical groupings associated with that source IP address. Translation module 116 may then associate each retrieved logical grouping with incoming network packet 126.

In examples where the systems and methods described used herein use multiple attribute maps, translation module 116 may only search relevant attribute maps (determined, for example, by map category 510 of attribute map 122) when translating a distinguishing attribute into a logical grouping. For example, extraction module 114 may have extracted two different distinguishing attributes of different categories, such as source IP address and destination IP address. In this example, translation module 116 may provide the source IP address distinguishing attribute as an input to an attribute map with map category data indicating that it maps source IP addresses to logical groupings. Similarly, translation module 116 may provide the destination IP address distinguishing attribute as an input to an attribute map with map category data indicating that it maps destination IP addresses to logical groupings.

Figure 8:
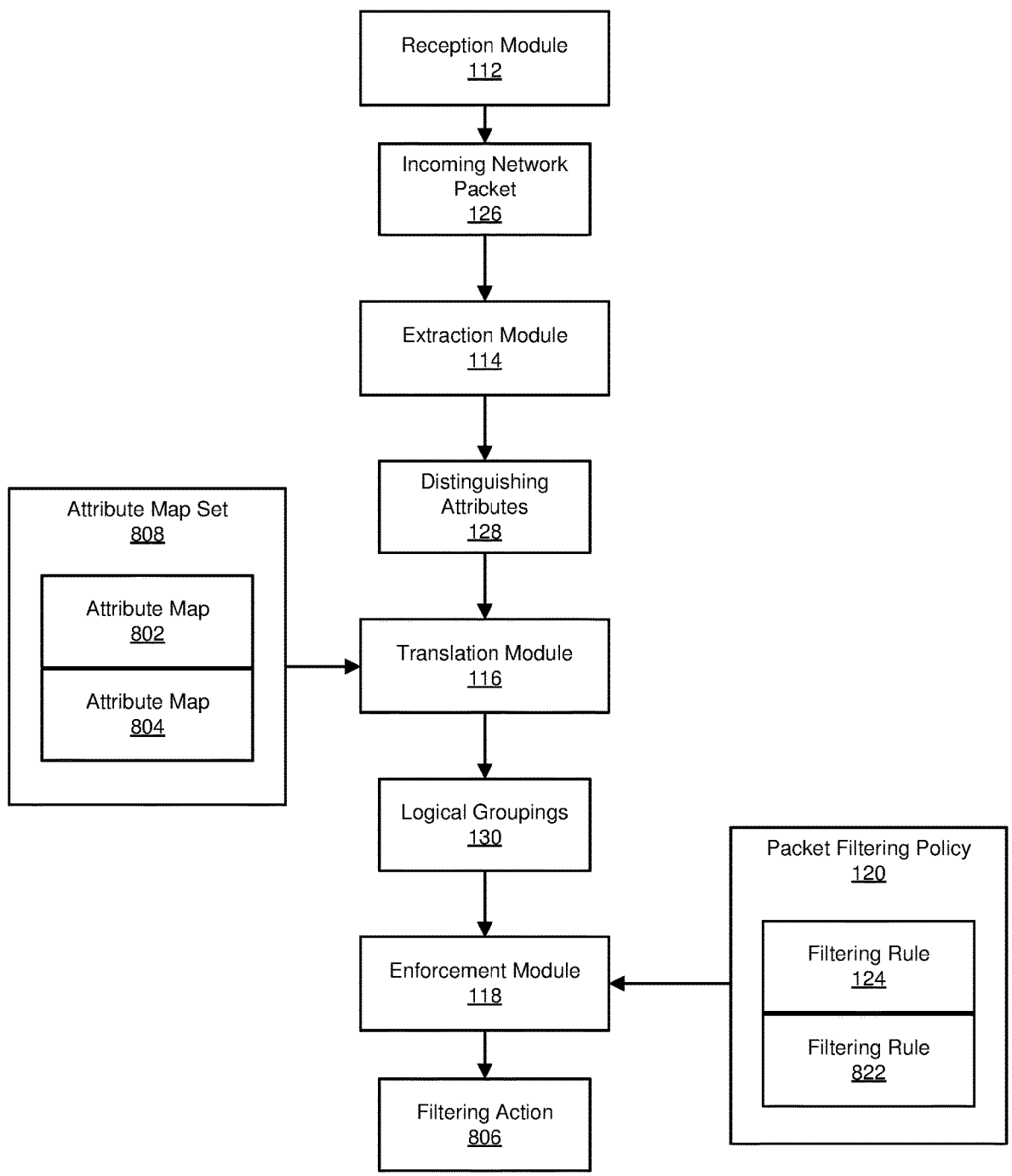
FIG. 8 is a block diagram of an example system for high-efficiency network-packet filtering that uses multiple attribute maps and applies multiple filtering rules.

FIG. 8 is an illustrated example of a packet-filtering system that uses multiple attribute maps and multiple filtering rules. As shown in FIG. 8, reception module 112 may receive incoming network packet 126 and extraction module 114 may extract distinguishing attributes 128 from incoming network packet 126, as described above. Extraction module 114 may also extract or otherwise identify information indicating a category of each extracted distinguishing attribute, as described in greater detail above. Translation module 116 may then, as part of translating each distinguishing attribute, identify an appropriate attribute map within attribute map set 808. For example, translation module 116 may determine that one particular distinguishing attribute may be translated using attribute map 802, while a different distinguishing attribute should be translated using attribute map 804. Translation module 116 may use map categories associated with each attribute map (e.g., map category 510 as illustrated in FIG. 5). Translation module 116 may provide each distinguishing attribute as an input to an appropriate attribute map and receive in return a logical grouping associated with the input distinguishing attribute. Once translation module 116 has translated each distinguishing attribute in distinguishing attributes 128 into logical groupings 130, enforcement module 118 may determine a filtering action 806 based on packet filtering policy 120, as will be described in greater detail below.

In some embodiments, attribute map 122 may not include an entry for a particular distinguishing attribute that is being translated by translation module 116. In these embodiments, attribute map 122 may return a default logical grouping to translation module 116, such as "unknown IP address" or "external IP prefix." Configuration module 110 may configure these default responses as part of configuring packet filtering policy 120 and/or defining attribute map 122. By providing default or "catch-all" responses in this way, an attribute map may ensure that other elements of system 100 are able to enforce packet filtering policy 120 on all incoming network packets, regardless of whether the distinguishing attributes associated with those network packets have been explicitly defined in an attribute map.

At step 250 in FIG. 2, one or more of the systems described herein may apply the packet filtering policy to the incoming network packet by using the one or more logical groupings of the incoming network packet as input parameters to the one or more filtering rules. For example, enforcement module 118 may apply packet filtering policy 120 by using logical groupings 130 as input parameters to filtering rule 124.

As described in greater detail above, other modules of system 100 may determine logical groupings of incoming network packet 126. Enforcement module 118 may use these logical groupings in conjunction with the filtering rules defined by packet filtering policy 120 when determining a filtering disposition for incoming network packet 126. Enforcement module 118 may use logical groupings 130 as inputs to packet filtering policy 120, which may compare logical groupings 130 to the filtering rules defined by configuration module 110, which is described in greater detail above. Enforcement module 118 may then determine, based on the filtering actions indicated by the filtering rule or rules that match logical groupings 130. In some embodiments, enforcement module 118 may iterate through an ordered list of filtering rules and act upon the filtering action specified by the first filtering rule that matches logical groupings 130. For example, and with reference to FIG. 8, enforcement module 118 may determine that filtering rule 124 matches logical groupings 130. Enforcement module 118 may accordingly perform filtering action 806 based on the filtering disposition specified by filtering rule 124 without checking if filtering rule 822, which appears later in the list of filtering rules than filtering rule 124, matches logical groupings 130.

As a specific example, an administrator may seek to enforce a policy that allows computing devices from the HR department to access certain network resources while denying those same computing devices access to all other applications. The administrator may implement this packet filtering policy by defining two filtering rules. In the first rule, the filtering rule may indicate that network packets associated with logical groupings marking them as originating from an HR department computing device and destined for a permitted application should be accepted. A second rule, ordered after the first rule, may indicate that all network packets from HR department computing devices should be dropped. Network packets associated with logical groupings that match the first rule may trigger the "accept" filtering disposition, and enforcement module 118 may ignore the second rule for those packets since the logical groupings of the packets already matched a higher-priority filtering rule. Meanwhile, a network packet whose logical groupings indicate that it is not destined for a permissible application will not match the first rule. In these examples, enforcement module 118 may then proceed to check the logical groupings associated with the network packet against the next filtering rule in the ordered list. This next filtering rule may be the second filtering rule described above which indicates that all network packets from HR department computing devices should be dropped. Enforcement module 118 may determine that the distinguishing attributes of the network packet match the "HR department" logical grouping and drop the network packet in accordance with the action specified by the filtering rule. By contrast, obsolete filtering policies may require a separate filtering rule for each IP address, network prefix, or other identifier associated with the HR department. The systems and methods described herein may improve the efficiency of packet filtering systems by reducing the number of filtering rules required to enforce filtering policies that are similar or identical to those described by such obsolete filtering policies, thereby enabling packet filtering systems to more efficiently reach a disposition for how to handle any particular incoming network packet.

In further embodiments, the filtering rules may be stored in a hash map, where logical groupings represent keys and filtering dispositions represent values. In these embodiments, enforcement module 118 may provide a logical grouping to the filtering rules as a key to the hash map and receive a filtering disposition as a return value. Enforcement module 118 may then treat incoming network packet 126 in according with the filtering action specified by the filtering disposition.

Given that attribute maps may link different distinguishing attributes to the same logical grouping, a single filtering rule may define filtering actions to be taken against network packets that include different distinguishing attributes. In other words, at least one of the filtering rules in packet filtering policy 120 may filter different incoming network packets that include different distinguishing attributes based on each of those distinguishing attributes being associated with the same logical grouping in an attribute map.

Figure 9:
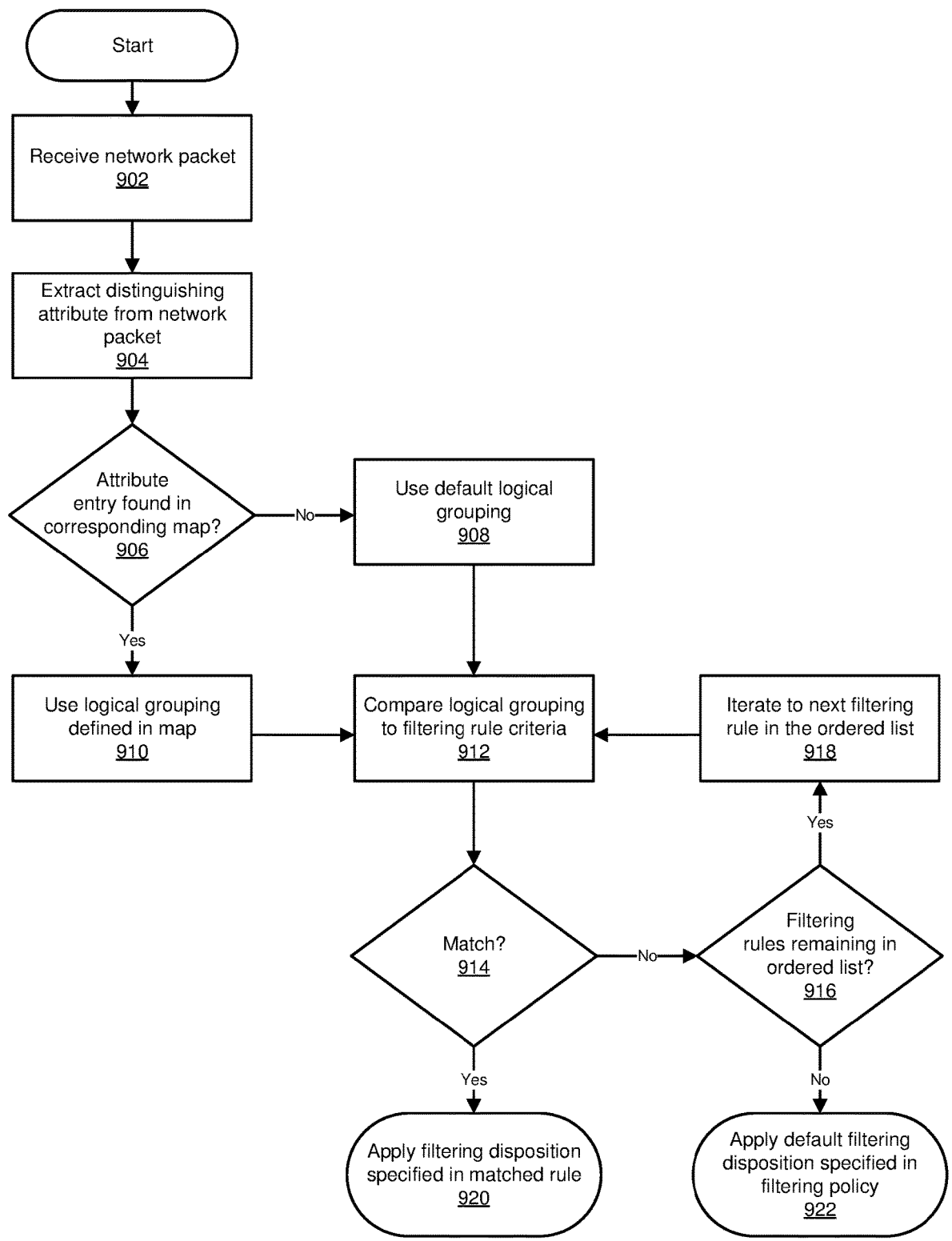
FIG. 9 is a flow diagram of an example decision process for high-efficiency network-packet filtering.

FIG. 9 illustrates an example decision flow that the systems described herein may use to determine a filtering disposition for a given network packet. Although not illustrated in FIG. 9, filtering policy 120 may include an ordered list of filtering rules that use logical groupings as input parameters. As illustrated in FIG. 9 at step 902, the systems described herein may receive a network packet. At step 904, the systems described herein may extract one or more distinguishing attributes from the network packet. Detailed descriptions of receiving a network packet and extracting the distinguishing attributes are provided in greater detail above. At step 906, translation module 116 may, for each extracted distinguishing attribute, search available attribute maps for an entry corresponding to the distinguishing attribute. If the attribute maps do not include an entry for the distinguishing attribute, translation module 116 may proceed to step 908 and use a default logical grouping for the network packet. If an entry corresponding to the distinguishing attribute is found in a corresponding attribute map, translation module 116 may proceed to step 910 and use the logical grouping defined in the attribute map.

At step 912, enforcement module 118 may compare the identified logical groupings of the network packet to the first rule defined in filtering policy 120. At step 914, enforcement module 118 may evaluate whether the logical groupings of the network packet match the filtering rule criteria. If enforcement module 118 determines that the logical groupings of the network packet match the criteria of the filtering rule, enforcement module 118 may apply the filtering disposition specified in the matched filtering rule and exit the decision flow. The systems described herein may then receive another incoming network packet and being the process from the beginning.

If enforcement module 118 determines that the logical groupings of the network packet being evaluated do not match the criteria of the filtering rule, enforcement module 118 may proceed to step 916 and check if any filtering rules in the ordered list remain to be examined. If no filtering rules remain to be examined, enforcement module 118 may proceed to step 922 and apply a default filtering disposition specified in filtering policy 120 (e.g., drop all network packets that do not match any defined filtering rule). If filtering rules do remain in the ordered list specified by filtering policy 120, enforcement module 118 may proceed to step 918, iterate to the next filtering rule in the ordered list, and return to step 912. Enforcement module 118 may repeat the examination loop of steps 912, 914, 916, and 918 until either a matching filtering rule is found or no more filtering rules remain to be examined.

Enforcement module 118 may perform a variety of filtering actions. For example, enforcement module 118 may drop incoming network packet 126, forward incoming network packet 126 to its destination, reply to the system that transmitted incoming network packet 126, and/or treat incoming network packet 126 in any other manner indicated by filtering rules that match the logical groupings associated with incoming network packet 126. Enforcement module 118 may also perform other actions that may not necessarily be dictated by a filtering rule. For example, enforcement module 118 may generate log entries detailing how various incoming network packets were handled. For example, enforcement module 118 may generate a log entry indicating that certain network packets were dropped in accordance with packet filtering policy 120. Additionally or alternatively, for each filtering rule in packet filtering policy 120, enforcement module 118 may increment a trigger counter associated with the filtering rule each time the filtering rule causes enforcement module 118 to act on a network packet. By tracking the activation of filtering rules in this way, enforcement module 118 may provide system administrators and/or other automated systems with information necessary to refine or update packet filtering policy 120.

Figure 10:
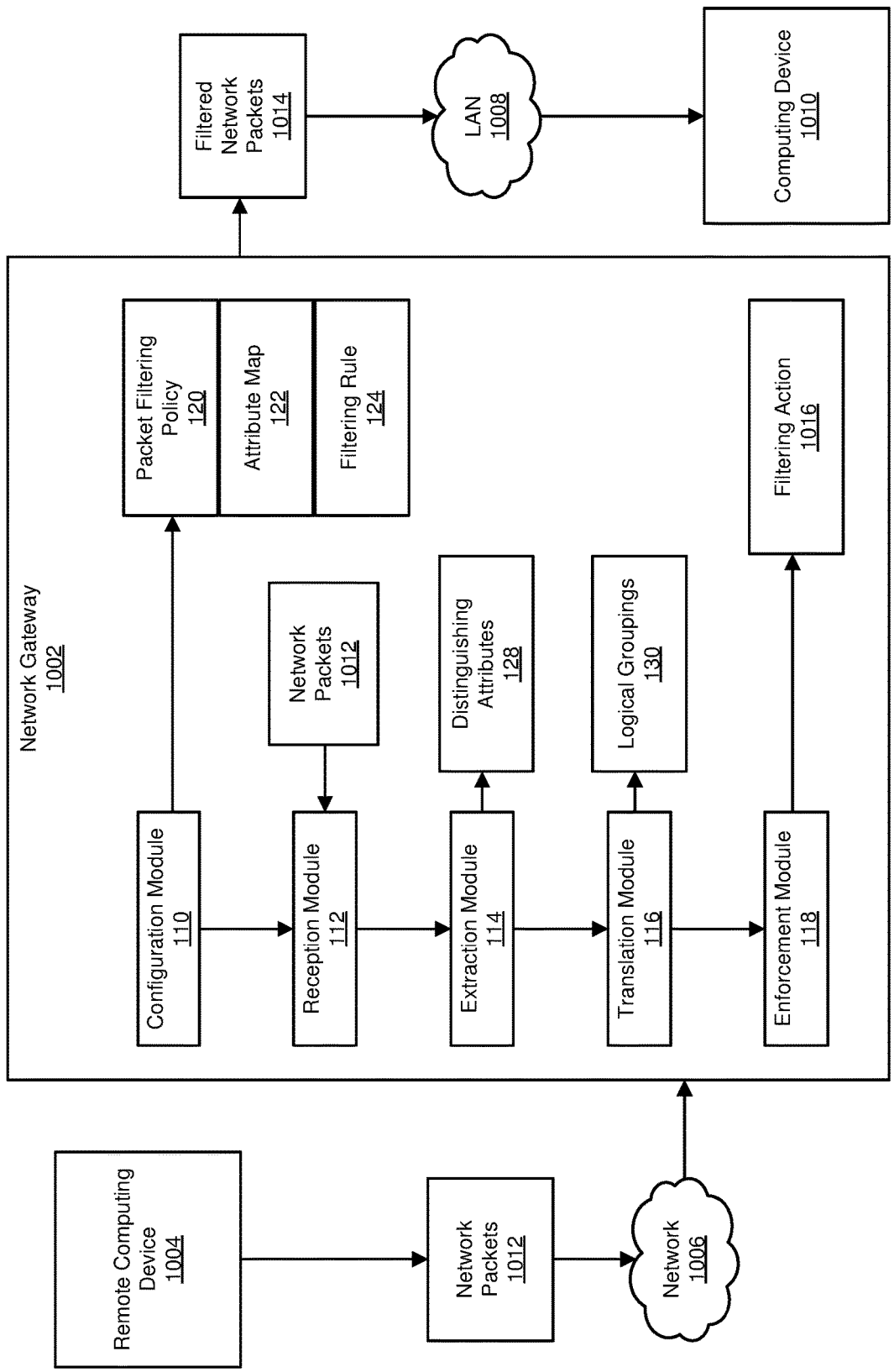
FIG. 10 is a block diagram of an example system for high-efficiency network-packet filtering operating on a network gateway that facilitates network traffic between a remote computing device and an endpoint device.

As described above, the systems and methods described herein may execute as part of a network gateway device that acts as an interface between networks. FIG. 10 is an illustrated example of system 100 executing on a network gateway 1002 that facilitates network traffic between network 1006 and LAN 1008.

In some examples, network 1006 may represent any medium or architecture capable of facilitating communication or data transfer. Examples of network 1006 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), combinations of one or more of the same, or the like. Network 1006 may facilitate communication or data transfer using wireless or wired connections.

As shown in FIG. 10, configuration module 110 may configure packet filtering policy by defining attribute map 122 and filtering rule 124. At some point in time after configuration module 110 has configured packet filtering policy 120, remote computing device 1004 may transmit network packets 1012 over network 1006, indicating that network packets 1012 are destined for computing device 1010. Reception module 112 may, at network gateway 1002, receive network packets 1012 and pass network packets 1012 to extraction module 114 for processing. Extraction module 114 may extract distinguishing attributes 128 from each network packet in network packets 1012. Translation module 116 may then translate distinguishing attributes into logical groupings 130 for each network packet in network packets 1012. Enforcement module 118 may, based on the logical groupings associated with each network packet and the filtering dispositions indicated by filtering rule 124, perform filtering action 1016 on each network packet. Enforcement module 118 may drop some of network packets 1012 while passing other network packets as filtered network packets 1014. Network gateway 1002 may then forward filtered network packets 1014 to computing device 1010 via LAN 1008.

As described in greater detail above, the systems and methods described herein may configure a network filtering policy based on attribute maps and filtering rules that describe filtering dispositions for various logical groupings of network packets. After the filtering policy has been configured, the systems and methods described herein may intercept network packets being transferred over a network to enforce the network filtering policy and extract various distinguishing attributes from each intercepted network packet. The systems and methods described herein may then translate these distinguishing attributes into logical groupings associated with the corresponding network packet and apply a filtering action based on the filtering dispositions described in any relevant matching filtering rules. The above-described packet filtering system may be implemented in a variety of contexts, such as on network gateways, endpoint firewalls, network load balancers, and/or at any other suitable point within a network.

The above-described filtering system may provide numerous advantages over traditional network-packet filtering systems. For example, filtering rules based on logical groupings may improve the ability of administrators to update filtering policies. As a specific example, administrators may update attribute maps to include new distinguishing attributes (e.g., new destination IP addresses) without having to modify any aspect of existing filtering rules. Moreover, in embodiments that handle very high volumes of network packets, the above-described network-packet filtering system may improve packet throughput of a filtering system due to the reduced number of packet-to-rule comparisons that must be made to arrive at a final filtering disposition. Similarly, the filtering system described herein may improve network resilience against certain forms of network attack, such as distributed denial of service (DDoS) attacks. For example, the reduced number of comparisons made by the systems described herein may enable a gateway device to process more network packets per second, thereby reducing the impact of a DDoS attack. As an additional example, automated systems may rapidly blacklist hostile computing devices by associating those devices in an attribute map with a logical grouping for hostile devices. Pre-written filtering rules may then handle network packets associated with that logical grouping without requiring any further administrator intervention. Administrators may also perform "cleanup" by removing attribute map entries for various computing devices while not modifying any existing filtering rules.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), smart network interface cards (Smart NICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules described herein may receive a network packet, extract distinguishing attributes from the network packet, transform the distinguishing attributes into logical groupings, transform the logical groupings into a filtering disposition, and apply the filtering disposition to the network packet. Furthermore, one or more of the modules described herein may use a result of the transformations to generate log entries describing filtering actions taken against network, send notifications to administrators, increment filtering tracking counters, and/or update attribute maps and/or filtering rules. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    configuring a packet filtering policy at least in part by:
        defining an attribute map that associates each of a plurality of distinguishing attributes of network packets with one or more logical groupings of distinguishing attributes, wherein each logical grouping comprises a plain-language identifier that describes an association between each distinguishing attribute associated with the logical grouping;
        defining one or more filtering rules for filtering network packets subject to the packet filtering policy, using the plain-language identifiers of one or more logical groupings of distinguishing attributes as input parameters for the one or more filtering rules; and
        converting an obsolete filtering rule that uses a specific distinguishing attribute as an input parameter into an updated filtering rule that uses, as defined in the attribute map, at least one plain-language identifier of at least one logical grouping of the specific distinguishing attribute as an input parameter by replacing the specific distinguishing attribute in the obsolete filtering rule with the at least one plain-language identifier;
    receiving, after configuring the packet filtering policy, an incoming network packet as part of examining a network connection that is subject to the packet filtering policy;
    extracting one or more distinguishing attributes of the network connection from the incoming network packet;
    translating, based on the attribute map, the one or more distinguishing attributes extracted from the incoming network packet into one or more plain-language identifiers of one or more logical groupings of the incoming network packet; and
    applying the packet filtering policy to the incoming network packet by using the one or more plain-language identifiers of the one or more logical groupings of the incoming network packet as input parameters to the one or more filtering rules.

2. The method of claim 1, wherein at least one of the one or more filtering rules filters, with the same filtering result, differing incoming network packets that comprise differing distinguishing attributes based on the differing distinguishing attributes each being associated with the same logical grouping in the attribute map.

3. The method of claim 1, wherein two or more filtering rules use the same logical grouping as an input parameter.

4. The method of claim 1, further comprising, for each filtering rule in the one or more filtering rules, incrementing a trigger counter associated with the filtering rule each time the filtering rule matches a network packet.

5. The method of claim 1, wherein the attribute map comprises a hash map that uses distinguishing attributes of network packets as keys of the hash map and uses logical groupings as values of the hash map.

6. The method of claim 1, further comprising defining a plurality of attribute-specific attribute maps at least in part by assigning, to each attribute-specific attribute map, a corresponding category of distinguishing attributes for use as input parameters.

7. The method of claim 1, wherein the distinguishing attributes comprise at least one of:

a host Internet Protocol address;
a destination Internet Protocol address;
a host port;
a destination port;
a subnet address;
a Transmission Control Protocol flag;
an IPv6 flow label;
a Media Access Control address; or
an Internet Protocol address prefix.

8. The method of claim 1, further comprising consolidating a plurality of obsolete filtering rules by:
   determining that each input parameter of each obsolete filtering rule in the plurality of obsolete filtering rules is associated, by the attribute map, with a particular logical grouping;
   determining that each obsolete filtering rule in the plurality of obsolete filtering rules applies a same filtering result to each network packet; and
   generating a unified filtering rule that uses the plain-language identifier of the particular logical grouping as an input parameter and applies the same filtering result to each incoming network packet that comprises distinguishing attributes that match the particular logical grouping.

9. The method of claim 1, further comprising updating a filtering policy for network packets that include a particular distinguishing attribute by modifying, within the attribute map, the logical groupings that are associated with the particular distinguishing attribute.

10. A system comprising:
    a configuration module, stored in a memory of the system, that configures a packet filtering policy at least in part by:
       defining an attribute map that associates each of a plurality of distinguishing attributes of network packets with one or more logical groupings of distinguishing attributes, wherein each logical grouping comprises a plain-language identifier that describes an association between each distinguishing attribute associated with the logical grouping;
       defining one or more filtering rules for filtering network packets subject to the packet filtering policy, using the plain-language identifiers of one or more logical groupings of distinguishing attributes as input parameters for the one or more filtering rules; and
       converting an obsolete filtering rule that uses a specific distinguishing attribute as an input parameter into an updated filtering rule that uses, as defined in the attribute map, at least one plain-language identifier of at least one logical grouping of the specific distinguishing attribute as an input parameter by replacing the specific distinguishing attribute in the obsolete filtering rule with the at least one plain-language identifier
    a reception module, stored in the memory of the system, that receives, after the configuration module configures the packet filtering policy, an incoming network packet as part of examining a network connection that is subject to the packet filtering policy;
    an extraction module, stored in the memory of the system, that extracts one or more distinguishing attributes of the network connection from the incoming network packet;
    a translation module, stored in the memory of the system, that translates, based on the attribute map, the one or more distinguishing attributes extracted from the incoming network packet into one or more plain-language identifiers of one or more logical groupings of the incoming network packet;
    an enforcement module, stored in the memory of the system, that applies the packet filtering policy to the incoming network packet by using the one or more plain-language identifiers of the one or more logical groupings of the incoming network packet as input parameters to the one or more filtering rules; and
    at least one physical computer processor that is configured to execute the configuration module, the reception module, the extraction module, the translation module, and the enforcement module.

11. The system of claim 10, wherein the enforcement module applies one or more filtering rules that filter, with the same filtering result, differing incoming network packets that comprise differing distinguishing attributes based on the differing distinguishing attributes each being associated with the same logical grouping in the attribute map.

12. The system of claim 10, wherein two or more filtering rules use the same logical grouping as an input parameter.

13. The system of claim 10, wherein the enforcement module increments, for each filtering rule in the one or more filtering rules, a trigger counter associated with the filtering rule each time the filtering rule matches a network packet.

14. The system of claim 10, wherein the attribute map comprises a hash map that uses distinguishing attributes of network packets as keys of the hash map and uses logical groupings as values of the hash map.

15. The system of claim 10, wherein the configuration module defines a plurality of attribute-specific attribute maps at least in part by assigning, to each attribute-specific attribute map, a corresponding category of distinguishing attributes for use as input parameters.

16. The system of claim 10, wherein the distinguishing attributes comprise at least one of:
    a host Internet Protocol address;
    a destination Internet Protocol address;
    a host port;
    a destination port;
    a subnet address;
    a Media Access Control address; or
    an Internet Protocol address prefix.

17. The system of claim 10, wherein the configuration module converts a plurality of obsolete filtering rules by:
    determining that each input parameter of each obsolete filtering rule in the plurality of obsolete filtering rules is associated, by the attribute map, with a particular logical grouping;
    determining that each obsolete filtering rule in the plurality of obsolete filtering rules applies a same filtering result to each network packet; and
    generating a unified filtering rule that uses the plain-language identifier of the particular logical grouping as an input parameter and applies the same filtering result to each incoming network packet that comprises distinguishing attributes that match the particular logical grouping.

18. A non-transitory computer-readable medium comprising one or more computer-readable instructions that, when executed by at least one physical processor of a computing device, cause the computing device to:
    configure a packet filtering policy at least in part by:
       defining an attribute map that associates each of a plurality of distinguishing attributes of network packets with one or more logical groupings of distinguishing attributes, wherein each logical grouping comprises a plain-language identifier that describes an association between each distinguishing attribute in the plurality of distinguishing attributes;

defining one or more filtering rules for filtering network packets subject to the packet filtering policy, using the plain-language identifiers of one or more logical groupings of distinguishing attributes as input parameters for the one or more filtering rules; and converting an obsolete filtering rule that uses a specific distinguishing attribute as an input parameter into an updated filtering rule that uses, as defined in the attribute map, at least one plain-language identifier of at least one logical grouping of the specific distinguishing attribute as an input parameter by replacing the specific distinguishing attribute in the obsolete filtering rule with the at least one plain-language identifier;

receive, after configuring the packet filtering policy, an incoming network packet as part of examining a network connection that is subject to the packet filtering policy;

extract one or more distinguishing attributes of the network connection from the incoming network packet;

translate, based on the attribute map, the one or more distinguishing attributes extracted from the incoming network packet into one or more plain-language identifiers of one or more logical groupings of the incoming network packet; and apply the packet filtering policy to the incoming network packet by using the one or more plain-language identifiers of the one or more logical groupings of the incoming network packet as input parameters to the one or more filtering rules.

* * * * *